United States Patent [19]

Abels

[11] 4,108,265
[45] Aug. 22, 1978

[54] HYDROSTATIC-TRANSMISSION CONTROL SYSTEM, ESPECIALLY FOR LIFT AND OTHER INDUSTRIAL VEHICLES

[75] Inventor: Theodor Abels, Aschaffenburg-Nilkheim, Germany

[73] Assignee: Linde Aktiengesellschaft, Wiesbaden, Germany

[21] Appl. No.: 688,774

[22] Filed: May 21, 1976

[30] Foreign Application Priority Data

May 22, 1975 [DE] Fed. Rep. of Germany ....... 2522719

[51] Int. Cl.² .............................................. B60K 17/10
[52] U.S. Cl. ..................................... 180/66 R; 60/491
[58] Field of Search ............ 180/66 R, 44 F; 60/494, 60/490, 448, 451, 433, 450, 491, 492

[56] References Cited

U.S. PATENT DOCUMENTS

| | | | |
|---|---|---|---|
| 2,886,944 | 5/1959 | Horwood | 180/66 R |
| 3,058,297 | 10/1962 | Tolley | 180/66 R |
| 3,214,911 | 11/1965 | Kempson | 60/450 |
| 3,243,959 | 4/1966 | Fantom | 180/66 R |
| 3,477,225 | 11/1969 | Cryder et al. | 60/433 |
| 3,650,107 | 3/1972 | Court | 60/490 |
| 3,986,358 | 10/1976 | Hoffmann | 60/490 |

FOREIGN PATENT DOCUMENTS 2,260,915 6/1974 Fed. Rep. of Germany ............. 60/494

*Primary Examiner*—David M. Mitchell
*Attorney, Agent, or Firm*—Karl F. Ross

[57] ABSTRACT

A hydrostatic-transmission control system for fork-lift trucks and like industrial vehicles has a pair of variable-displacement hydrostatic motors driving respective wheels on opposite sides of the vehicle and supplied by pump means having a control element for varying its displacement under the control of an operator. The prime mover, e.g. a gasoline engine or electric motor, drives the pump. The control system comprises means whereby, for low and average output speeds of the transmission consisting of a combination of pump means and motors, the control of the transmission ratio is a function only of the position of the aforementioned element whereas, for highest output speeds, the ratio is controlled at least in part independently of this element by a further parameter, e.g. prime-mover output.

2 Claims, 6 Drawing Figures

HYDROSTATIC-TRANSMISSION CONTROL SYSTEM, ESPECIALLY FOR LIFT AND OTHER INDUSTRIAL VEHICLES

FIELD OF THE INVENTION

The present invention relates to a control system for hydrostatic transmissions and, more particularly, to the control of hydraulically powered vehicles such as fork-lift trucks and other industrial vehicles adapted to carry heavy loads or to travel at particularly low speeds for precise placement of loads.

BACKGROUND OF THE INVENTION

Hydraulic transmissions and particularly hydrostatic transmissions are in widespread use for a number of purposes and generally comprise pump means, consisting of one or more pumps, driven by a prime mover such as an internal-combustion engine or an electric motor, and motor means such as one or more motors hydraulically connected with the pump means and displacing an output shaft or a number of such shafts.

The transmission ratio of such transmissions can be established by providing the pump means with a control element which varies the displacement of the fluid per revolution. When the pump means is an axial-piston pump, this control element can be a tiltable plate or control disk which varies the stroke of the axial pistons of the cylinder barrel (see pages 113 ff. of FLUID POWER, U.S. Government Printing Office, Washington, DC, 1966).

Frequently the hydraulic motors are also of the axial-piston type (op.cit. pages 199 ff.) and can have a variable output depending upon the position of the tiltable control element (usually the cylinder barrel) as well. In this case the variable displacement can be considered in terms of the fluid displacement per output revolution of the input shaft.

Such transmissions can be set such that the output shaft rotates at low speeds with very high torque, at high speeds with low torque or at any intermediate condition.

Transmissions of this type have received widespread application in industrial vehicles adapted to transport or control large loads. Typical of these applications is a fork-lift truck whose driving wheels may each be provided with a hydraulic motor forming part of a hydrostatic transmission of the type described. In these cases the hydraulic transmission has the advantage that it allows the vehicle to creep while carrying a relatively large load at a high position for precise stacking and to travel at high speeds when unloaded so as to move from place to place at a storage or other industrial facility.

In all cases the prior-art control arrangements had a selectively positionable control element for the hydrostatic transmission which would set the transmission ratio, i.e. the speed ratio between the input shaft of the pump means and the output shaft of the motor means as required by the vehicle operator, this element being coupled, for example, to a pedal or lever at the driver position.

In most instances this element positively and directly established a transmission ratio so that for a given input shaft speed the output shaft speed is always proportional to the setting of this element.

This has been found to be advantageous for many purposes and was believed heretofore to be the most advantageous arrangement for fork-lift trucks and the like. For example, with a fork-lift truck, when a heavy load is lifted into a high position and must be set in place carefully, this arrangement permitted the vehicle speed to be meticulously controlled, even with nonlevel floors or traveling surfaces, so that the vehicle could creep into a position independently of resistance to displacement of the vehicle. In general, therefore, it is of considerable advantage to have direct control of the transmission ratio by the operator for hydrostatic transmissions at low output speeds, especially for fork-lift trucks. Of course, the transmission ratio can be altered sharply when higher output speeds are required and this was accomplished merely by resetting the operator-controlled element.

In another conventional transmission arrangement, the transmission ratio was made fully dependent upon the load at the output shaft, i.e. the required output torque. This had the advantage that with increasing loading of the output shaft, the output speed was reduced so that increased torque was available and the power remained substantially constant. This prevented overloading of the machine and even loading it to bring its output shaft to standstill. Control systems of this type are commonly used for hydrodynamic transmission in road-travel automotive vehicles although they have also been used with hydrostatic transmissions by way of suitable controls.

Systems of the latter type, however, have not heretofore been utilized effectively for industrial-plant vehicles because they do not permit the sensitive control of the speed and positions of the vehicle obtainable with the direct transmission ratio control arrangement described above.

OBJECTS OF THE INVENTION

It is the principal object of the present invention to provide an improved hydraulic transmission control system whereby disadvantages of earlier arrangements can be avoided and sensitive transmission ratio control can be obtained when necessary.

Another object of the invention is to provide an improved control arrangement for hydrostatic transmissions, especially for industrial vehicles such as fork-lift trucks, enabling maximum utilization of the available power of the prime mover and transmission thereof.

Still another object of the invention is to provide a more efficient drive system for fork-lift trucks and like vehicles.

It is yet another object of the invention to provide a control arrangement for a hydrostatic transmission which improves the characteristics of the transmission and the drive arrangement.

SUMMARY OF THE INVENTION

These objects and others which will become apparent hereinafter are attained in accordance with the present invention in a control arrangement for a hydrostatic transmission having a control element displaceable by the operator and control means whereby at low or average output-shaft speeds a transmission ratio between the input and output shaft speeds is regulated exclusively as a function of the position of this element, and means whereby at output-shaft speeds greater than these, i.e. at the highest output-shaft speeds, the transmission ratio is controlled apart from this element in response to another operating parameter, preferably an output parameter of the prime mover or transmission.

When the principles of the present invention are applied to automotive vehicles, especially industrial vehicles of the fork-lift truck type, the pump means is preferably a variable-displacement hydrostatic axial piston pump whose shaft is coupled to the prime mover and constitutes the input shaft of the transmission. A swash plate or piston-stroke controlling element is the means whereby the transmission ratio can be regulated between this input shaft and a pair of output shafts, driven by respective axial-piston hydrostatic motors hydraulically connected to the pump and further connected to the driving wheels of the vehicle. The prime mover is an internal-combustion engine or an electric motor.

The present invention is based upon my recognition that the characteristics of direct transmission ratio control are important only at low speeds of the vehicle, for example for displacing a load of a fork-lift truck. However, at higher speeds such precise control of vehicle speed and transmission ratio is of no interest and it is advantageous here to provide a more "automotive" or inertial control whereby the transmission setting is a function of the engine speed.

According to the present invention, the advantages of both transmission characteristics are combined in that in the low speed range the transmission ratio is directly controlled by the operator whereas in the high speed range it is controlled by another operating parameter of the vehicle system, for example the output speed of the engine.

The advantage of each of these two distinct transmission characteristics is attained without loss of advantage of the other transmission characteristic when either one is more desirable.

Conventional forklift trucks with internal combustion engines as prime movers and hydrostatic transmissions having their pump shaft connected to the crankshaft of the engine, have a pedal directly coupled to the ratio-changing element of the transmission and simultaneously entraining a speed-control element of the engine, i.e. the accelerator lever of the carburetor.

With older and smaller forklift trucks the pedal directly sets the transmission and can be depressed against a restoring force which amounts to the resistance of the control element to displacement, i.e. the reaction of the pistons against displacement of the control element. In newer and larger forklift trucks, the pump is set by a servomechanism so that the speed-changing rate is limited by the rate at which the auxiliary servomechanism medium can be displaced in the servosystem. In either case the rate at which the ratio can be changed is limited to an acceptable degree. Consequently, for a given operating condition, the maximum power utilization can be described by a propulsion-force hyperbola. This characteristic is so developed that, when the vehicle carries its nominal load for displacement along a planar horizontal surface, maximum possible acceleration is attained only when the driver presses the pedal to the floor, i.e. "floors" the pedal. The entrainment of the speed-adjusting member of the engine with the pedal is designed so that the crankshaft speed for any particular power is somewhat greater than that which is required by the transmission. For climbing or for displacing heavy trailers, an override control may be operated by hand for a still higher engine speed or the pedal must be further displaced to provide an acceleration.

The system of the present invention, as described above, should also be distinguished from the characteristic of hydrodynamic converters and corresponding controls for hydrostatic transmissions conventionally used for automotive purposes and wherein the vehicle speed is automatically adjusted in accordance with the resistance thereto. When the vehicle is operated under a dragging load over long stretches with high speeds, these systems are highly advantageous since they compensate for changes in the contour between climbing, level and falling stretches of the road. These systems, however, are not at all suitable for use with forklift trucks which frequently must travel with a raised heavy load over poor surfaces with exact positioning of the load at a particular point at which the load may be set down or raised. Under these conditions the vehicle must travel at very low speeds and be precisely controlled. The aforementioned system in which speed is a function of travel resistance is totally ineffective under these conditions.

Thus, the arrangement of the present invention allows the vehicle to operate under the most advantageous speed conditions, i.e. high speeds at which precise control is not needed and low speed at which such control is desirable, as required. Where precise control is desirable there is direct control of the transmission ratio from the pedal, independent of the engine speed and hence a proportionality between the pedal position and the vehicle speed. The higher vehicle speeds are, for all practical purposes, an automatic control response to resistance to travel.

According to another feature of the invention, the further parameter which contributes to the control of the transmission ratio at higher speeds of the vehicle is the output speed of the driving prime mover, e.g. an internal-combustion engine.

I have found it to be advantageous that not only the pump is a variable-displacement machine but each of the motors constitutes a variable-displacement machine as well and has a setting element, e.g. a tiltable control plate or cylinder barrel, whose position determines the number of revolutions of the output shaft per unit volume of the fluid throughput through the hydrostatic transmission.

According to an important feature of the invention, means is provided for controlling each of these elements so that the transmission ratio is established solely by the setting element of the pump over a speed range from standstill of the output shaft to a predetermined speed thereof, whereupon the control element of the pump is supplemented or replaced by the control element of the motor for regulation of the transmission ratio in accordance with the aforementioned further parameter over a speed range of the output shaft above this predetermined value.

Each of the hydrostatic motors of the transmission can be provided with a pressure-responsive servomechanism which has a piston defining in a cylinder a responsive chamber which is connected by a conduit between a constant-output auxiliary pump driven by the engine and a throttle location. A constant-volume auxiliary pump is a pump which has a constant fluid output per revolution. The net output of the pump per unit time is thus a function of the engine speed so that the pressure ahead of the throttle likewise is a function of the engine speed. This throttle can be placed in effect automatically when the main pump, i.e. the pump of the transmission, has reached its greatest displacement-per-revolution setting.

According to still another feature of the invention, each of the servomechanisms operating the control element of the respective hydrostatic motor has its compartment connected between the transmission pump and a throttle having a variable flow cross section. The variable flow cross section of the throttle can be controlled by an element independently of the pump-control element, i.e. another lever or pedal, or an element operatively connected to the pump-control element, so that the throttle cross section starts to reduce and thereafter is continuously reduced when the transmission pump has been set into its position of greatest stroke volume per revolution. Thus further operation of the control element for this pump in the direction tending to increase the output speed of the transmission will not affect the variable element of the pump but will only act upon the throttle previously mentioned.

I have found it to be desirable, with a system of the latter type and any arrangement in which the servomechanism for the hydraulic motor is tapped from the main hydraulic medium network of the transmission, to provide from each port of the transmission pump respective branches containing check values which run to a common junction, the check valves respectively permitting flow to respective ports from this junction.

A pressure relief valve is provided with its output side opening toward this junction and its input side turned to one port of a changeover valve which permits the higher pressure of the two main lines connecting the transmission pump with the transmission motors to be delivered to the pressure relief valve. This same port is advantageously connected to a fixed throttle which communicates via a pressure relief valve with the variable throttle mentioned above. Each of the servomechanisms may have another compartment upon the servomechanism piston in a direction opposite that of the pressure in the first-mentioned compartment and connected to a location between the fixed throttle and the first pressure relief valve. The effective piston cross section in the second compartment can be substantially less than the effective piston cross section of the first-mentioned compartments.

According to another feature of the invention, a controllable valve can be provided in the line connecting the pressure source to the first-mentioned compartments of the servomechanisms and operated by the control element for the transmission pump so that, upon resetting of this pump to a smaller stroke volume than its maximum, the first compartments of the servomechanisms are drained.

It has already been mentioned that a particularly desirable arrangement is obtained when the prime mover is an internal combustion engine and the speed control for this engine is operatively connected with the transmission ratio controller of the transmission. However, to an increasing extent prime movers of fork-lift trucks are electric motors and I have found that when the electric motor is a shunt wound motor the transmission ratio control can be coupled with a field controller so that in the high-speed setting the transmission ratio control comes into play to decrease the current through the field windings of the shunt wound motor.

As noted, it is especially advantageous with the present system to provide a hydrostatic transmission in which both the pump and the motors are of the variable-displacement type having respective control elements which regulate the strokes of the respective pistons. According to the invention such a transmission is operated so that, from standstill to a certain output speed of the motor shafts, only the control element of the pump is displaced from its neutral or zero-displacement position to its maximum stroke volume position until the pump has achieved its maximum fluid displacement per revolution. Only thereafter is the motor element shifted from its maximum fluid displacement position toward the smallest permissible displacement position.

This mode of operation of the transmission has proved to be especially effective for the precise control of low vehicle speeds and the operation of the vehicle at high speeds by another parameter, e.g. the accelerator position of an internal-combustion engine or a setting member of an electric drive motor.

The pump is preferably directly controlled, i.e. the control member operated by the driver of the vehicle is coupled directly to the displacement-regulating element of the pump to obtain the desired proportionality between the setting of the control member and the transmission ratio for low speeds. The control elements of the motors, however, need be connected only indirectly with the control element since they may be operated, preferably automatically, by the other parameter of the machine.

In many cases it is desired to operate below the maximum possible acceleration or with less than maximum speed. In these conditions the hydraulic motor elements are operated only as desired. Thus, instead of a load-regulating or power control which automatically maintains a constant power, the secondary adjustment of the motor-control elements can be achieved in a simple manner.

It is possible to control the secondary speed adjustment via an orifice so that, after the full angular displacement of the pump-control element for a given load condition, for example travel of a forklift truck with raised load along a planar surface, an approximately constant power is maintained. Thus, there are two possibilities for exploitation of a single throttle. Either the static pressure ahead of the throttle position can be used to control the setting of the hydraulic motors, or the flow of control fluid through the throttle constriction can be used directly to control the setting of the hydraulic motor. In the latter case the rate of adjustment of the motor-control elements is limited by the constriction.

Generally the hydraulic motor has only two basic positions, namely, a position of maximum displacement over which the motor is operated until the pump-control element has reached its maximum angular position away from the neutral, and the motor-control position corresponding to minimum stroke volume into which the motor is set once the pump has achieved its maximum stroke position. The movement of the motor from the first to the second position takes place slowly.

If the operator wishes to maintain a constant vehicle speed between the speed conditions at the two extremes of the motor settings, the control is effected by operating the primary element, i.e. the pump control.

This poses no particular difficulty although it should be noted that readjustment of the pump-control element after it has been brought into its extreme maximum-stroke position results in a shifting of the motor-control element from the secondary extreme position toward the first so that the control characteristic has a certain hysteresis.

The pump-control element may be operatively connected with a valve, for example by a lever, so that when the pump-control element is at least close to its maximum stroke volume and is adjusted, the valve leading to the servomotors of the hydraulic motors is shifted to drive the control elements of these motors to a reduced angular position. The control of the motor elements by the hydraulic medium stream through the aforementioned throttle ensures that acceleration is never extreme and that a reduced speed can be maintained by operation of the pump-control element. Of course, the valve can be closed even by the slightest displacement of the pump-control element if it is desired to switch out a response of the motor and vice versa.

With the combination of the present invention in which the primary side (pump) of the hydrostatic transmission is controlled, one can achieve true constant-power control or at least a markedly simpler regulation of the vehicle speed with optimum characteristics both for low-speed and high-speed travel. The system utilizes the available power of the apparatus more fully and allows higher operating speeds, especially with forklift trucks. The pedal forces for control of the transmission can be held relatively low and the pump and motor-control elements can be direct, e.g. via levers, or with the aid of servomechanisms whereby the proportionality between the position of the actuating member (e.g. the drive pedal) and the control element of the pump is maintained. The drive shaft of the pump may also be provided with an auxiliary pump which can supply the servomechanisms of the hydraulic motors, preferably via an adjustable throttle which can be controlled from the pressure in the transmission.

BRIEF DESCRIPTION OF THE DRAWING

The above and other objects, features and advantages of the present invention will become more readily apparent from the following description, reference being made to the accompanying drawing in which.

SPECIFIC DESCRIPTION

For ease of understanding, the invention will be specifically described as applied to a forklift industrial vehicle adapted to travel in warehouses, dockyards and other industrial enclosures with the fork in a raised or lowered position, with or without a load and powered by a prime mover which can be an internal-combustion engine or an electric motor.

Where the prime mover is an electric motor it may be operated by a battery carried by the vehicle itself and recharged during periods of nonuse of the vehicle. However, the system is applicable to other hydraulically driven vehicles and hence the specific description as applied to forklift vehicles should not be considered a limitation to them although they are the preferred mode of realizing the invention.

Furthermore, when reference is made to a hydraulic pump, the pump may be a hydrostatic axial-piston pump of the type described in "FLUID POWER", supra. Such pumps have a swash plate for controlling the stroke of the pistons upon angular displacement of the swash plate from a neutral position to angular extreme positions to either side of the neutral position and corresponding to forward and reverse travel of the vehicle. The pump is driven by the prime mover.

The hydraulic motors described herein can be axial-piston motors as illustrated and discussed in "FLUID POWER" (supra) with variable stroke obtained by swinging the cylinder barrel relative to the output shafts. The output shafts are coupled to the driving wheels of the vehicle and/or to tracks for propelling the same.

Finally, by way of introduction, it will be noted that servomechanisms are sketchily described herein to displace the control elements of the pump or motors. In this case the more complex hydraulic servomechanism of "SERVOMECHANISM PRACTICE", McGraw-Hill Book Co., 1960, may be used, complete with pilot valves or pistons, follower pistons and the like.

Figure 1:
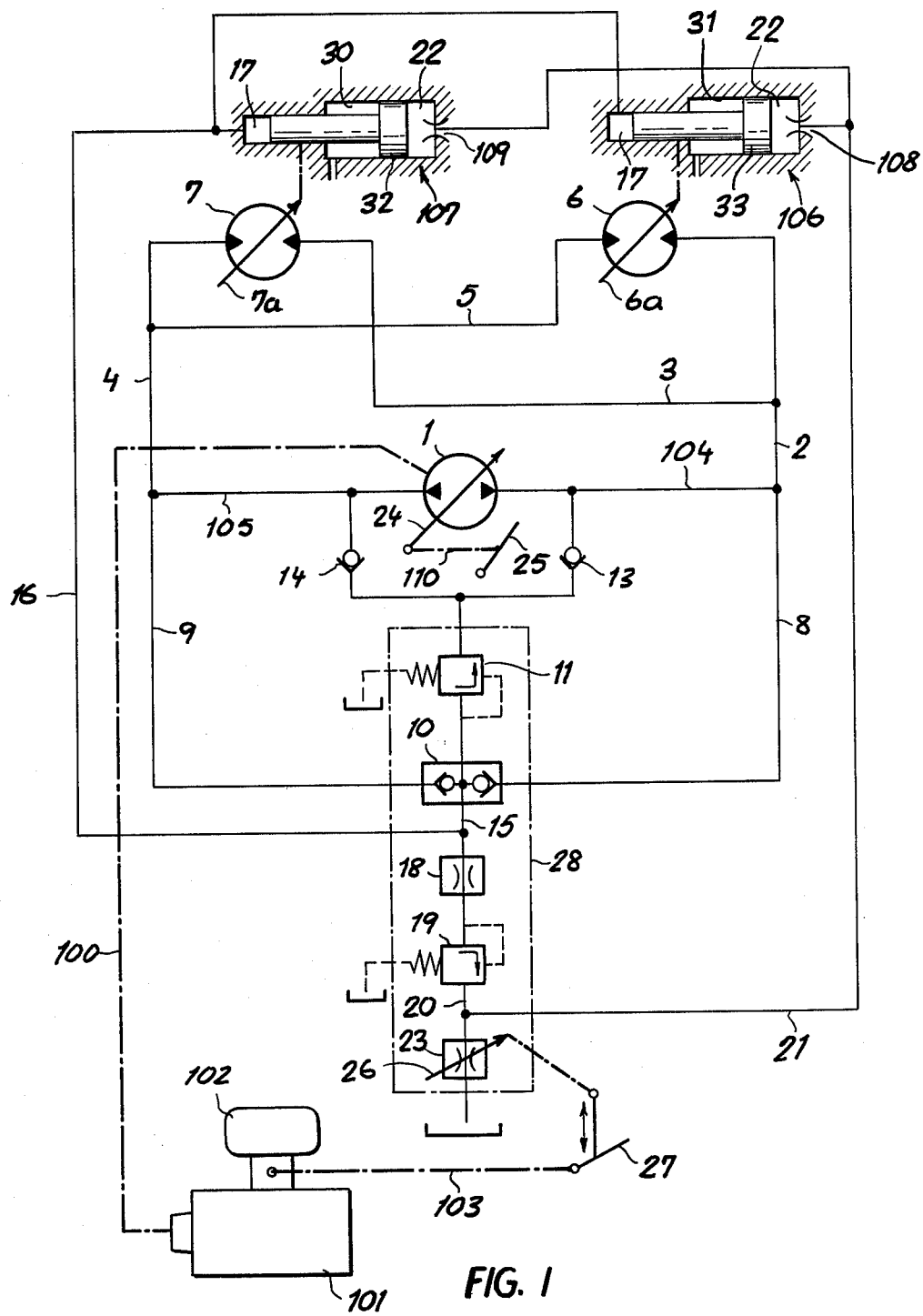
FIG. 1 is a hydraulic circuit diagram of a transmission according to the invention.

Referring first to FIG. 1 it will be apparent that the basic elements of a transmission, according to the invention, comprise a pump 1 driven, as represented by the dot-dash line 100, by an internal combustion engine 101 whose carburetor 102 has its butterfly or accelerator control tied via a linkage 103 to an accelerator pedal 27. The pump 1 is reversible as described and feeds hydraulic fluid via lines 104 and 105 to lines 2 and 3 connected to one side of each of a pair of hydromotors 6 and 7. The other side of the pump is connected to lines 4 and 5 communicating with the opposite sides of the hydromotors 6 and 7 which have variable displacement, being provided with control elements represented at 6a and 7a respectively. Each of these motors 6, 7 operates the drive wheel on one side of the vehicle.

Figure 6:
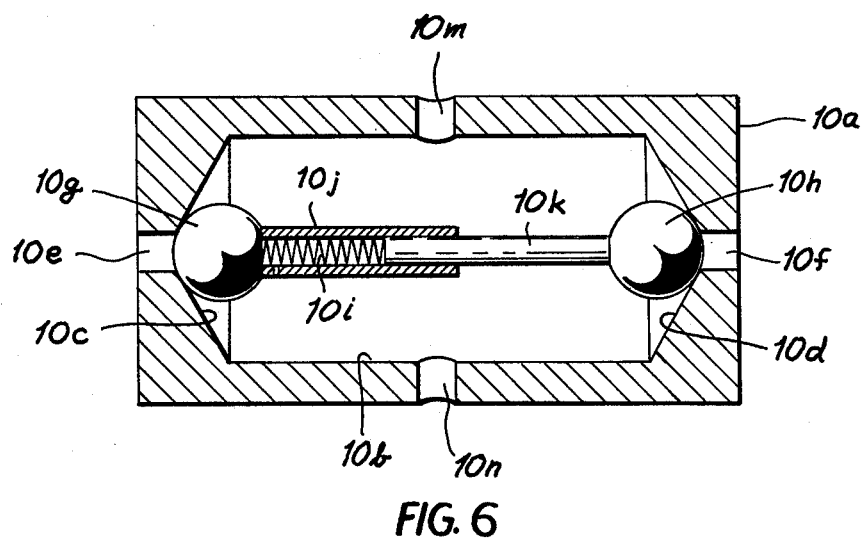
FIG. 6 is a diagrammatic cross-sectional view of a changeover valve of the type used in accordance with the present invention.

A line 8 is connected to line 2 and line 9 is connected to line 4, the lines 8 and 9 extending to opposite inlet ports of a changeover valve 10 best seen in FIG. 6.

The changeover valve as shown in FIG. 6 can comprise a housing 10a forming a cylindrical chamber 10b with frustoconical seats 10c and 10d at respective inlet ports 10e and 10f. The seats 10c and 10d are engageable by ball-shaped closure members 10g and 10h held apart by a spring 10i within a tubular stem 10j carried by ball 10g. A stem 10k carried by the other ball 10h is telescopingly received in the stem 10j. The housing 10a also has outlet ports 10m and 10n which are connected as will be described in greater detail below.

When the pressure at inlet port 10e prevails over the pressure at inlet port 10f, the ball 10g is thrust inward and the pressure of port 10e is delivered to outlet ports 10m and 10n. When the pressure at port 10f prevails over the pressure at port 10g, member 10h is displaced inwardly and this pressure is communicated to ports 10m and 10n.

Thus, the higher pressure prevailing in the lines 8 and 9 is applied to the outlets 10m and 10n of the changeover valve and to the inlet of a pressure-relief valve 11 which communicates with a line 12 tied by a pair of check valves 13 and 14 to the lines 104 and 105. The check valves 13 and 14 prevent the pressure from the pump outlet, whichever side it happens to be at a particular moment, from being applied to line 12. These check valves, however, allow fluid from line 12 to be returned to the intake side of the pump. Valve 11 thus effectively establishes a threshold pressure in line 15 to which the port 10n of the chamber 10 is connected.

Line 15 terminates in a fixed-cross-section constriction 18 ahead of another pressure-relief valve 19 whose discharge side communicates with a variable-cross-section throttle 23 whose control member 26 is linked to the accelerated pedal 27 of the engine 101.

A line 16 communicates between line 15, ahead of the throttle 18, and the small-cross-section chambers 17 of a pair of servomotors 106, 107 whose pistons 33 and 32, respectively, are connected to control elements 6a and 7a of hydraulic motors 6 and 7.

The pistons 32 and 33 are stepped to have small-diameter ends in the compartments 17 and large-diameter ends in cylinder bores 30 and 31 of the servomotors to define compartments 22 therein with larger effective surface areas than those of compartments 17.

A line 21 communicates between line 20, ahead of the adjustable throttle 23, and the large-diameter compartments 22 via further throttles 108, 109 whose flow cross sections regulate the rate at which fluid can be fed to the compartments 22.

The control element 24 of the pump 1 is coupled by a lever network 110 directly with a pedal 25 constituting the control member which is in turn displaceable by the operator.

Another arrangement (FIG. 2) can provide a small hydraulic (oil) stream from a feeding pump P to act against the spring force of the hydraulic motor. In this case, the pump-control member 125 can operate the pump element 124 until it has reached its maximum displacement. Thereafter the double-arm linkage 120 causes the valve 120c to be operated, introducing fluid to the servomotor 122 against its spring force.

When the control of the servomotors of the hydraulic motors is effected by the static pressure ahead of a throttle in a circuit containing an auxiliary pump with a constant displacement, this static pressure increases and thus raises the transmission ratio as soon as the speed of the engine and thus the auxiliary pump increases. Thus, when the accelerator of the internal combustion engine is set to a higher value and the engine is operating at higher power, the transmission is automatically set to a higher speed of the output shafts of the motor. When the rotary speed of the engine is reduced, e.g. as a result of overloading the latter, the transmission is automatically set into a smaller ratio and hence relieves the loading of the internal combustion engine. The setting of the transmission pump does not need to be changed during this operation.

Preferably, the transmission pump is actuated by a pedal 25 (FIG. 3) and/or a manually actuatable lever by the vehicle operator to establish the transmission ratio at the desired level. The hydromotors can be operated by the pressure in the transmission and preferably or especially by the output speed of the engine. The control element of the hydromotors may be a valve which is switched into operation when the hydromotor control is desired.

The control element of the pump (125, FIG. 2) should be swingable in either direction out of its neutral position for driving the transmission in either direction and both forward and rearward travel may utilize the characteristic of the invention whereby a prime mover parameter may be used to control the hydromotors when the pump element is in its limiting operative position. However, this dual characteristic operation is preferred for at least the forward movement.

The pump element may have a double-arm lever 125, each of whose arms is provided with an abutment, the abutments being effective when the element is in one or the other extreme position to actuate the hydromotor valve 120c always in the same sense. In this case it has been found to be advantageous to put the pilot valve or other input element of the hydromotor servomechanism close to the actuator of the pump and thereby avoid linkages, setting errors or the like. This arrangement also makes it possible to simply adjust the strokes of the various elements so that directly upon termination of movement of the pump-control element, the movement of the motor-control element will commence.

Referring again to FIG. 1 it will be seen that a displacement of the pump-control element 24 of pump 1, when the latter is driven by engine 101, will result, for example, in the supply of fluid under pressure to line 104 and to the right side of each of the hydromotors 6 and 7 to drive the vehicle, for example, in the forward direction. A low pressure prevails in line 105 and a high pressure in line 104. As the pedal 25 is displaced still further, the deviation of control element 24 from its neutral position increases, thereby increasing the pressure in line 104. This pressure is applied via line 8 to one input of the changeover valve 10 and through this valve is applied to line 15 whence it is delivered via conduit 16 to the compartments 17 tending to hold the actuating elements 6a and 7a in their maximum stroke positions.

If because of increased engine speed or greater resistance to forward movement, the pressure builds up in line 2 still further, fluid is forced through throttle 18 and operates the threshold pressure relief valve 19. The pressure delivered to line 20 is also a function of the flow cross-section provided by the throttle 23 which is linked with the pedal 27 operating the engine 101 i.e. the throttle 23 closes as engine speed increases. Thus, the pressure delivered via line 21 to compartments 22 is a function of the pressure threshold of valve 19, the pressure bled through throttle 18 and the flow cross-section of throttle 23. Since the pressure at line 21 is invariably less than that at line 15, but the effective cross-sectional areas of compartments 22 is substantially greater than that of compartment 17, the pistons 32 and 33 are subject to differential pressure displacement to the left to reduce the motor stroke and thereby the loading of the engine and increase the output speed.

When the control element 24 is swung in the opposite sense from its neutral position, a similar operation ensures except that line 105 is pressurized and the hydromotors 6 and 7 are rotated in the opposite sense. In either case, excessive pressure buildup cannot occur because any excess pressure is bled back through pressure-relief valve 11 to the intake side of the pump.

Figure 2:
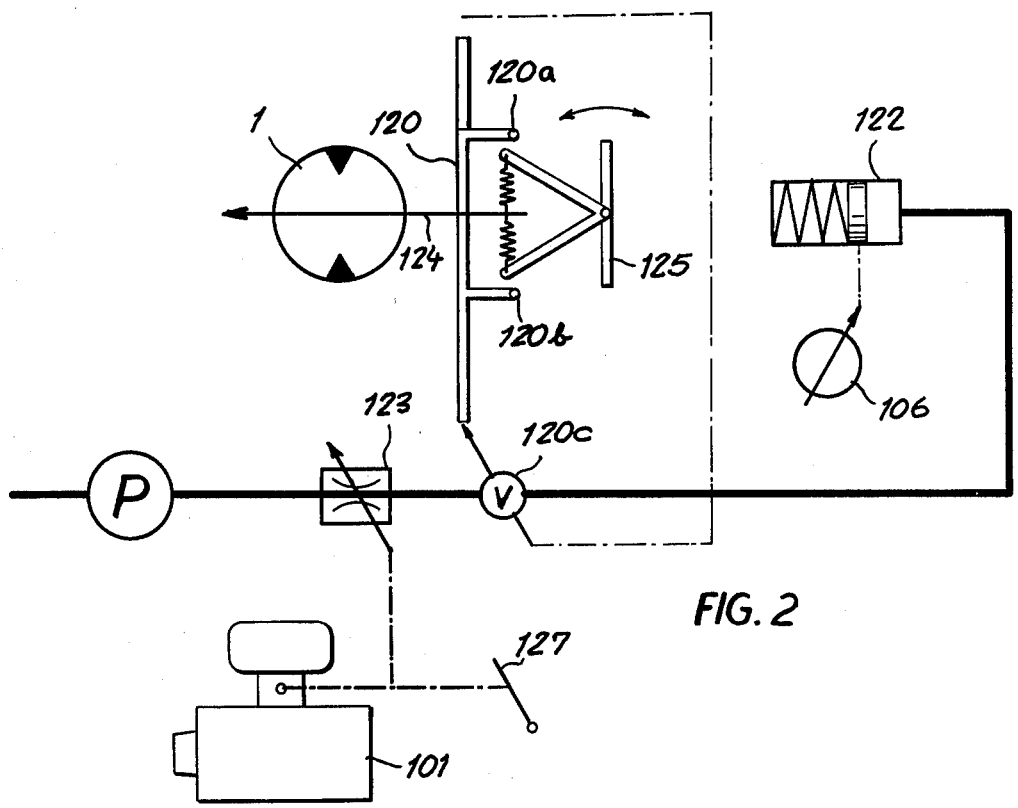
FIG. 2 is a diagram of a portion of a control system illustrating the principles of the invention.

FIG. 2 shows an arrangement in which a pedal 125 is connected to the control element 124 of a pump 1 to operate the latter in either direction. In either extreme position of the pump-control element, a double-arm lever 120 is operated via its abutments 120a and 120b to open a valve 120c connected in series with the throttle 123 corresponding to the throttle 23 previously described. In this embodiment the servomotor 122 is supplied through the throttle 123 which is controlled by the accelerator pedal 127 of the engine 101. Thus, instead of the static pressure beyond the throttle 123 being effective to operate the servomotor of the hydraulic motor (e.g. motor 106), the control pressure is obtained by opening the valve 120c when the pump-control element 124 has reached its limiting position.

Figure 3:
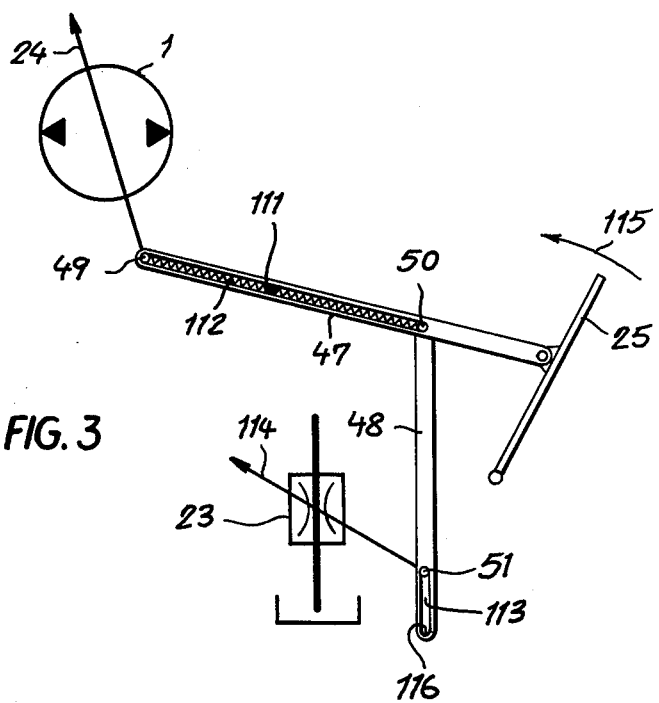
FIG. 3 shows another coupling in diagrammatic elevational view between the control member and the system for regulating the hydraulic motors.

In FIG. 3 I have shown an arrangement in which the pedal 25 is connected via a link 47 having a slot 111 with the control element 24 of the pump 1. In this embodiment, the control element 24 has a slide 49 received in the slot 111 and normally urged by a spring 112 against the left-hand end of this slot. This spring has a force which exceeds the normal displacement force for the element 24 until its reaches its extreme position.

A further link 48 is connected to link 47 and also has a slot 113 in which a slide 51 is received. The slide 51 is carried on the control element 114 of the throttle valve 23.

When the pedal 25 is displaced in a counterclockwise sense (arrow 115), therefore, the spring 112 will hold the slide 49 in its extreme position until the control element 24 of pump 1 has reached its extreme counterclockwise position. At this point, further displacement of pedal 25 will compress the spring 112 without further displacement of element 24. At this point, the bottom edge 116 of the slot 113 engages the slide 51 to enable the throttle 23 to be closed and increase the pressure behind it. This pressure is communicated to the hydromotors via line 21 as noted.

Figure 4:
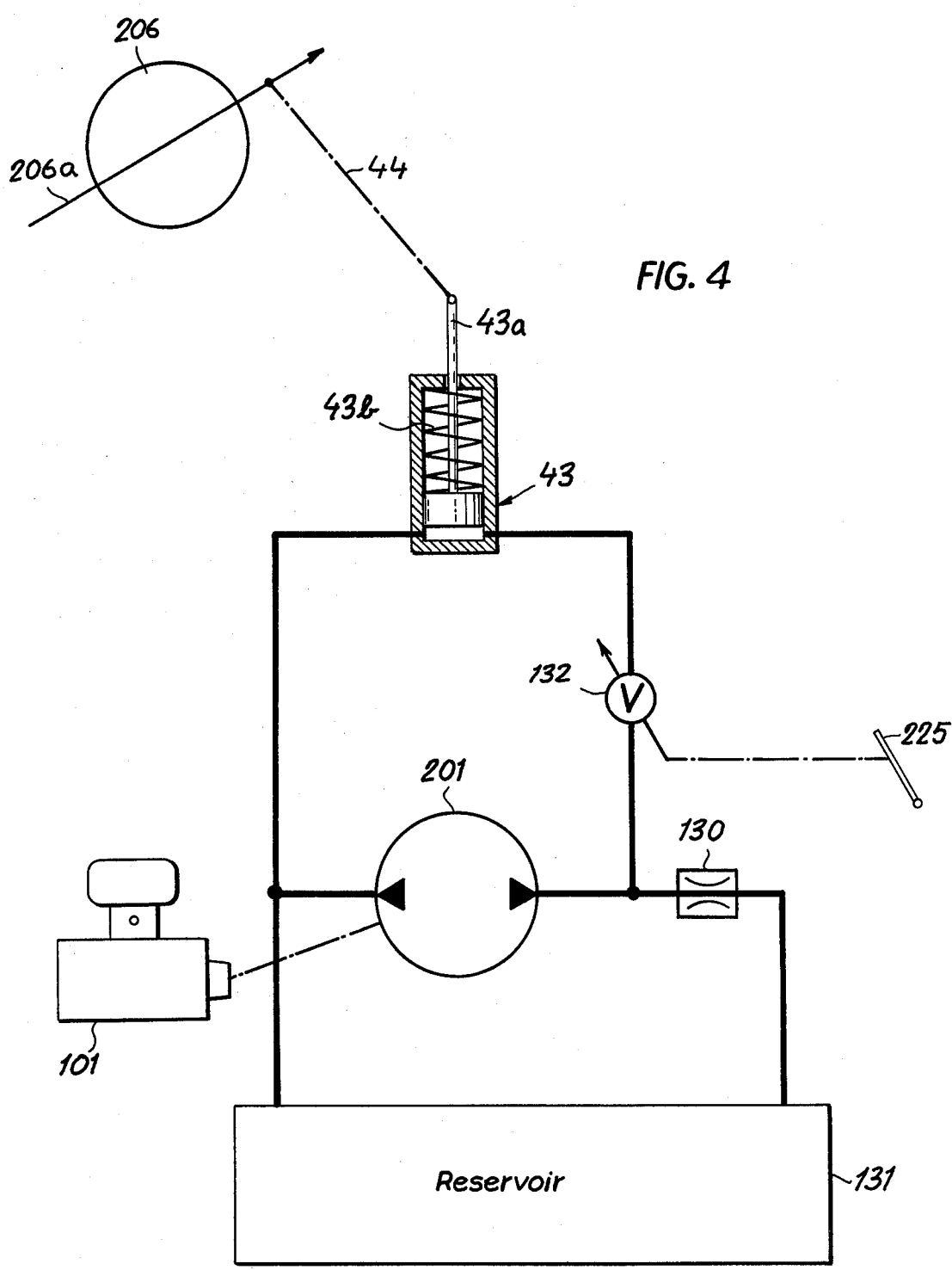
FIG. 4 is a diagram of still another arrangement embodying the present invention.

FIG. 4 shows that the engine 101 can drive the pump 201 (auxiliary pump) in addition to the transmission pump 1 which is not shown here. The auxiliary pump has a constant displacement per revolution and forces fluid to flow through a throttle 130 in a circulation path with a reservoir 131. When the pedal 225 controlling the position of the pump element of the main pump 1 is displaced after the pump element has reached its extreme operative position, e.g. via a lost-motion arrangement as shown in FIG. 3, it opens a valve 132 connecting a location behind the throttle 130 with a servomotor 43 whose piston 43a operates the control element 206a of the hydraulic motor 206 via a link 44. The spring force against which this hydraulic force operates is represented by a spring 43b which can, of course, be the resilient force of the hydraulic motor-control element resisting such displacement.

Figure 5:
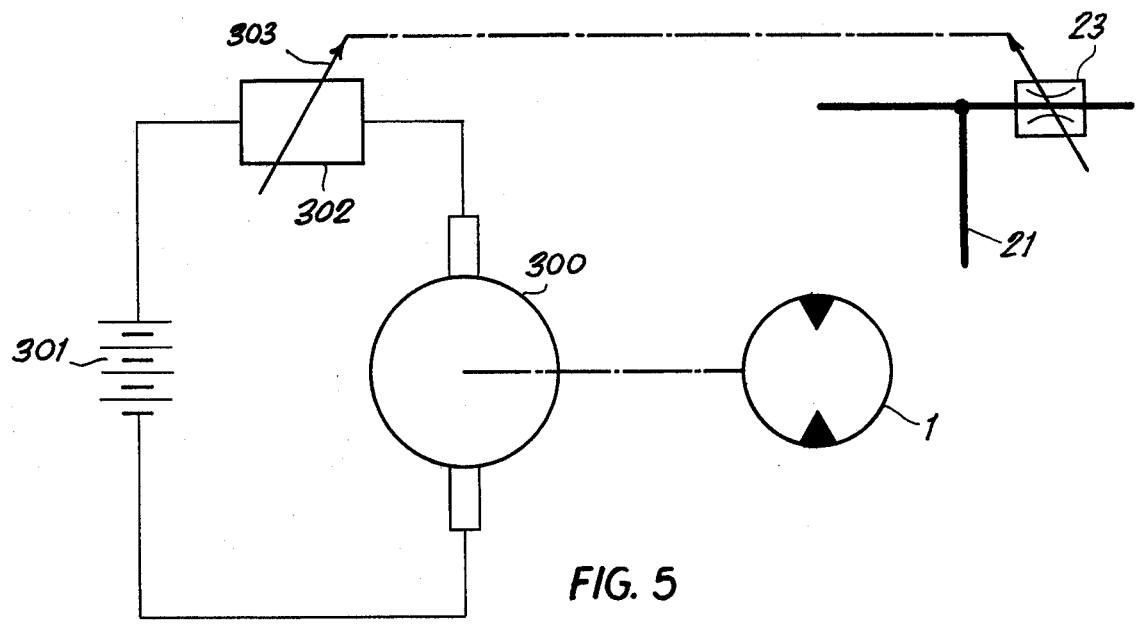
FIG. 5 shows a portion of the system of the invention as applied to an electrically powered vehicle.

FIG. 5 shows a system in which a shunt-wound motor 300 constitutes the prime mover and is connected to the storage battery 301 of the forklift truck by a controller 302 which reduces the field of the windings for increasing speed. In this case, the motor 300 is connected to the pump 1 and the control element 303 for the motor can be coupled with the throttle 23 energized by this pump as described in FIG. 1 and not shown in further detail in FIG. 5. The output for the hydraulic motors is tapped as in FIG. 1 from behind the throttle 23 via line 21.

Note that for a given hydraulic fluid flow rate (volume per unit time) for one of the hydraulic motors, the speed (RPM) of the motor increases when the stroke volume per revolution is decreased.

I claim:

1. A vehicle-drive system comprising:
a prime mover;
a pair of driven wheels for propelling said vehicle;
a hydrostatic transmission having variable-displacement pump means formed with an input shaft connected to said prime mover, motor means hydraulically connected to said pump means and formed with at least one output shaft connected to said wheels, and a motor-displacement control element, said transmission having a variable speed ratio between said input shaft and said output shaft depending at least in part upon the position of a pump-displacement control element for regulating the displacement per revolution of said pump means;
at least one operator-controlled actuating member; and
control means operatively connecting said member with said pump-displacement control element, operatively connected to said motor-displacement control element, and effective at low to average speeds of said motor means and said output shaft for establishing said ratio solely as a function of said member and at higher speeds of said motor means and said output shaft controlling said ratio as a function of the motor-displacement element as another operating parameter of the drive system, said motor means comprising a pair of motors having a variable fluid displacement per revolution and respective control elements for establishing the fluid displacement per revolution of said motors, each of said motors being formed with a hydraulic servomotor operatively connected to the respective control element of the motor, said pump means including a reversible hydrostatic pump having a pair of ports, each of said motors having a pair of ports connected to the pair of ports of said pump, said control means comprising a changeover valve having inlet ports respectively connected to the ports of said pump and at least one output port, a first pressure-relief valve connected between said output port and the ports of said pump by respective check valves, a first control line connected with the output port of said changeover valve and one side of each servomotor, a fixed-cross-section throttle connected with said first line, a second pressure-relief valve downstream of said fixed-cross-section throttle, a variable-cross-section throttle downstream of said second pressure-relief valve, a second control line connected between said variable throttle and said second pressure-relief valve and opening into said servomotors on the opposite sides thereof, and means for varying the flow-cross-section of the variable throttle.

2. A vehicle-drive system comprising:
a prime mover;
a pair of driven wheels for propelling said vehicle;
a hydrostatic transmission having variable-displacement pump means formed with an input shaft connected to said prime mover, motor means hydraulically connected to said pump means and formed with at least one output shaft connected to said wheels, said transmission having a variable speed ratio between said input shaft and said output shaft depending at least in part upon the position of a control element for the displacement per revolution of said pump means;
at least one operator-controlled actuating member and
control means operatively connecting said member with said element and effective at low to average speeds of said motor means and said output shaft for establishing said ratio solely as a function of said member and at higher speeds of said motor means and said output shaft controlling said ratio as a function of another operating parameter of the drive system, said motor means comprising a motor having a variable fluid displacement per revolution and a respective control element for establishing the fluid displacement per revolution of said motor, said motor being formed with a hydraulic servomotor operatively connected to the control element of the motor, said control element of said motor being said other parameter, said pump means including a reversible hydrostatic pump having a pair of ports, said motor having a pair of ports connected to the pair of ports of said pump, said control means comprising a changeover valve having inlet ports respectively connected to the ports of said pump and at least one output port, a first pressure-relief valve connected between said output port and the ports of said pump by respective check valves, a first control line connected with the output port of said changeover valve and one side of said servomotor, a fixed-cross-section throttle connected with said first line, a second pressure-relief valve downstream of said fixed-cross-section throttle, a variable-cross-section throttle downstream of said second pressure-relief valve, a second control line connected between said variable throttle and said second pressure-relief valve and opening into said servomotor on the opposite side thereof, and means for varying the flow-cross-section of the variable throttle.

* * * * *